Feb. 9, 1960   J. M. MERGEN ET AL   2,924,281
MECHANICAL AUTOMATIC PROPELLER FEATHERING
Filed June 11, 1953   2 Sheets-Sheet 1
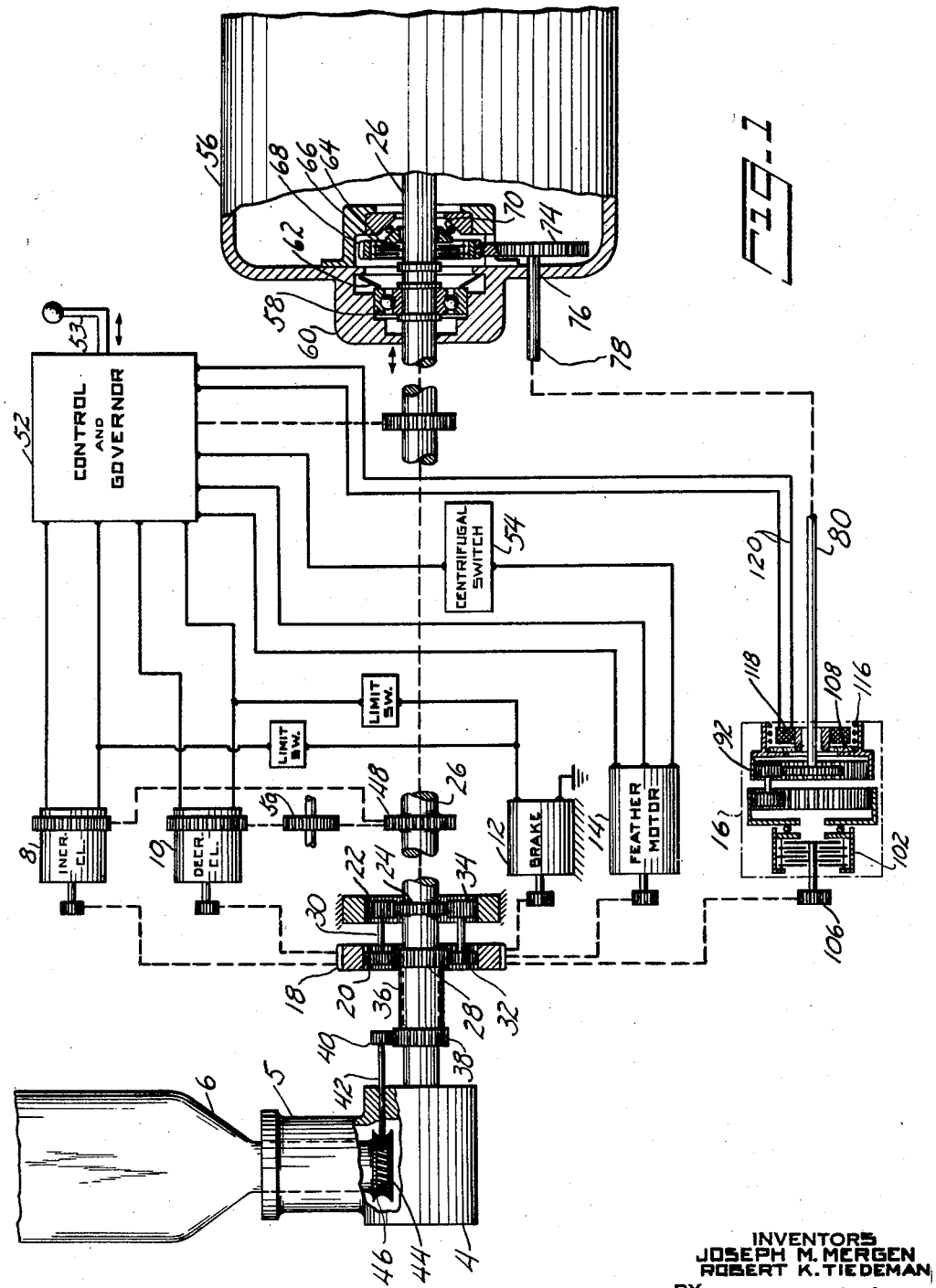
INVENTORS
JOSEPH M. MERGEN
ROBERT K. TIEDEMAN
BY
*Godfrey B. Speir*
ATTORNEY

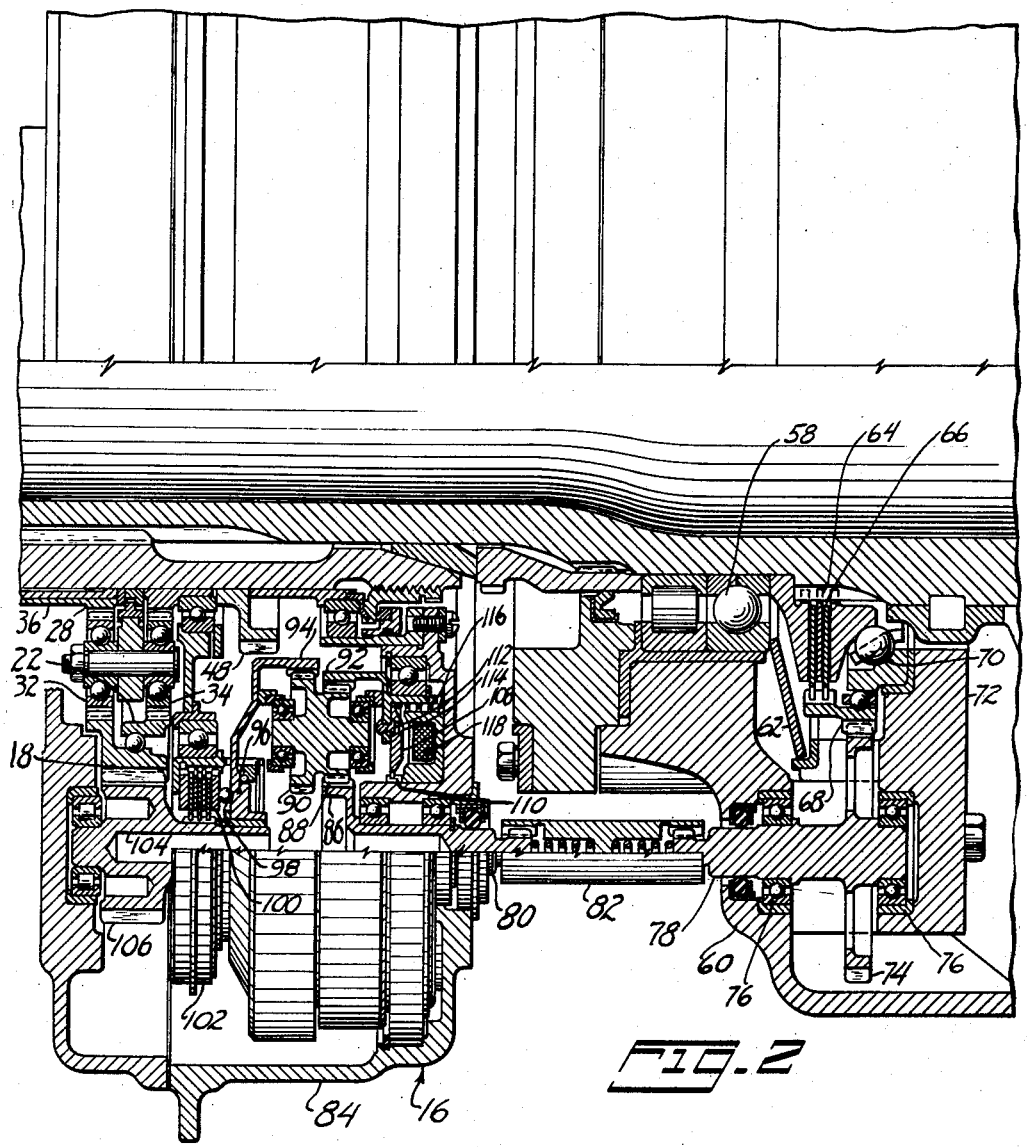

United States Patent Office 2,924,281
Patented Feb. 9, 1960

2,924,281

MECHANICAL AUTOMATIC PROPELLER FEATHERING

Joseph M. Mergen, Verona, and Robert K. Tiedeman, Packanack Lake, N.J., assignors to Curtiss-Wright Corporation, a corporation of Delaware Application June 11, 1953, Serial No. 360,968

12 Claims. (Cl. 170—160.13)

This invention relates to aircraft power plants including propellers driven by prime movers, and to certain phases of their operation.

In conventional propeller-engine combinations of modern type, propellers are constructed and controlled to vary in pitch. In normal flight regimes, propeller blade pitch is adjusted so that each blade has a positive angle of attack to the relative air stream to produce a thrust reaction in the propeller shaft, imposing propulsive thrust on the aircraft. Propellers are normally equipped for emergency feathering so that if the power plant fails, the propeller may selectively be adjusted to feather pitch, minimizing drag so that the airplane will maintain adequate speed due to thrust provided by other power plants on the aircraft. Also, propellers are usually equipped for pitch reversal to enable braking of the aircraft either in the air or upon landing, increasing the overall safety of flight. These general types of propeller adjustments are conventional regardless of the type of engine which may drive them. Either reciprocating engines or turbine engines are utilized to drive propellers and the same general functions are included for both types of power plants.

As requirements become more critical with increased aircraft and engine performance, there is a need for expeditious automatic feathering of a propeller in case of failure of any part of its power plant system, in order to decrease propeller drag quickly when a particular propeller ceases to function as a thrust producing device. The conventional manually operated selective feathering system becomes too slow, particularly when the option is left to the air crew for judging which of several propellers should be feathered.

There have been proposed automatic propeller feathering systems which are responsive to the torque reaction of an engine. Upon engine failure, the normal torque ceases and this lack of torque is used to energize a control device which automatically feathers the propeller through the normal propeller control system. While such a device has considerable merit, it only takes into account an actual engine failure and may not operate effectively if there is a failure or malfunction in the propeller control system proper.

Particularly as propeller controls become complex when propellers are applied to turbine engines, it becomes desirable to provide an automatic feathering control for the propeller which becomes effective either upon power plant failure or upon failure of the propeller control or governing system.

To make an emergency system of this type most effective, it is desirable to sense the failure in the most direct and obvious manner possible. Since a propeller normally produces thrust, a lack of thrust will indicate a malfunction of some part of the system, so that a lack of thrust or a reversal of normal thrust may be used to initiate propeller feathering. Since some portions of the propeller itself are fallible, it is desirable to apply propeller feathering action as close as possible to the propeller blades, rather than through some complex control mechanism which is, in itself, fallible.

Accordingly, it is an object of the present invention to provide a propeller feathering system which, so far as possible, is completely independent of the normal propeller control mechanism or of the engine or its control mechanism. It is a further object of this invention to provide an automatic propeller feathering system which is responsive to reversal of propeller thrust and which acts, through a separate and rugged mechanism, to feather the propeller blades, independently of normal control mechanism for the propeller.

It is a further object of the invention to provide a simple, rugged, wholly mechanical emergency propeller feathering system wherein its probability of successful operation is extremely high.

Still another object of the invention is to provide an emergency propeller feathering system which is applicable to propellers of various kinds and types, and which includes means to enable neutralization thereof at such times as reverse thrust may deliberately be demanded of the propeller.

In general, the invention includes a driving train including a clutch mechanism which is normally uncoupled when the propeller is operating in a normal manner. Upon failure of any part of the power plant system which results in the imposition of reverse thrust by the propeller on the power plant, the clutch is coupled and mechanically drives the propeller blades to a feathering blade angle, regardless of pitch demands which might be imposed by other portions of the propeller or power plant control system. The particular arrangements of a preferred embodiment of the invention, applied to one particular sort of propeller, are described hereafter in connection with the attached drawings, in which:

Fig. 1 is a schematic view of a propeller, pitch change mechanism and control system, driven by a power plant, and including the present invention; and Fig. 2 is a longitudinal section of a portion of a propeller and power plant assembly showing a specific practicable arrangement for the invention.

In Fig. 1, a propeller hub 4 is shown which includes one or more blade sockets 5. A blade 6 is journalled in each socket by means well known in the art for rotation about its own axis whereby the blade may be set to any desired pitch position from full feather to reverse pitch. In the embodiments shown, an electromechanical pitch changing system is shown which includes an increase pitch clutch 8, a decrease pitch clutch 10, a brake 12, a feather motor 14, and an emergency feather mechanism 16, all of which devices 8 through 16 have output pinions which are drivably engaged with a control gear 18. The interior of the gear 18 is a ring gear 20 forming part of a planetary transfer gearing system which includes another fixed ring gear 22, a sun gear 24 mounted on or driven by the propeller shaft 26, an output sun gear 28, and planet pinion assemblies 30 including planets 32 engaging the gears 20 and 28 and planet pinions 34 engaging the gears 22 and 24. The output sun gear 28 is integral with a sleeve 36 embracing and rotatable with and with respect to the propeller shaft 26, the sleeve 36 having a gear 38 which drives a pinion 40 carried on a shaft 42 journalled in the propeller hub 4. Within the propeller hub, the shaft 42 carries a worm 44 engaging a worm wheel 46 secured to the inner end of the blade 6.

When the control gear 18 is stationary, the gear 24 drives the planets 34 and 32 against the fixed ring gears and causes the output gear 28 to rotate in unison with the propeller shaft, thereby holding propeller pitch fixed. If the gear 18 is rotated in either direction, the sleeve 36 will be caused to rotate relative to the propeller shaft, thereby rotating the worm 44 and changing the pitch of the propeller blade.

Normally, the brake 12 when locked, holds the control gear 18 stationary and prevents pitch change. When pitch increase is desired, the clutch 8 is engaged, the clutch housing being driven at all times by a gear 48 on the propeller shaft. Engagement of the clutch causes it to drive the gear 18 in one direction to increase pitch. In similar fashion, the decrease pitch clutch 10 is driven by the gear 48 through an idler 50 for reversal of direction, and the control gear 18 is driven in the opposite direction to decrease pitch. The clutches 8 and 10 are electrically energized and are interconnected with the electrically releasable brake 12. The latter is released simultaneously with the engagement of either clutch 8 or 10 to allow pitch change to occur. The normal pitch change of the propeller is controlled by a control assembly 52, the details of which are not significant in this invention, except that selection of pitch regime may be made by a selector 53. This may be set to call for feather, reverse pitch, specific blade angles, and such blade angles as will control the power plant to a desired rotational speed.

For final phases of selective feathering or unfeathering of the propeller, the feather motor 14 may be energized by appropriate manipulation of the control assembly 52, which, as is known in the prior art, unlocks the brake 12 to enable feathering action. The feather motor 14 is normally only energizable when the propeller is either stationary or rotating at low speed, the feather motor being under the control of a centrifugal switch 54 which prevents feather motor operation when the engine is operating at high speed. Initial phases of feathering or final phases of unfeathering are accomplished by the clutches 8 and 10.

The propeller, through the shaft 26, is driven by a power plant 56 and according to the present invention, the propeller shaft 26 is mounted in the engine for limited motion along its axis.

From now on, reference may be made to both Figs. 1 and 2 for an appreciation of the specific provisions of this invention.

The shaft 26 is carried in a thrust bearing 58 whose inner race is secured to the shaft 26 but whose outer race may move to a limited extent in an axial direction within an engine nose housing 60. A conical spring washer 62, commonly called a Belleville washer, presses the bearing 58 to the left, or in a normally forward direction, against the forward setting for the bearing. If there is normal or leftward thrust as shown, the outer race of bearing 58 is pressed against its setting. If reverse or rightward thrust is imposed upon the propeller shaft 26, the outer race of the bearing will move rightwardly, compressing the Belleville washer 62 if the thrust is adequate, and allowing displacement of the bearing 58 and of the shaft 26 to the right.

The shaft 26 carries clutch plates 64 interleaved with clutch plates 66 carried on the inside of a gear 68. The clutch plates are backed up by a ball thrust bearing 70 acting against a bearing housing 72 rigid with the engine nose housing 60. By this mechanism, the clutch 64, 66 is engaged upon the occurrence of reverse thrust, and the gear 68 is rotated. The latter gear is meshed with a gear 74 journalled in the nose housing at 76 and drives the feathering unit 16.

Description of the feathering unit proper will be directed particularly to Fig. 2, although part of the components to be described will also be found in the schematic representation of the emergency feathering unit 16 shown in Fig. 1.

The gear 74 drives a shaft 78 which in turn drives a shaft 80 through a torsionally rigid but otherwise flexible coupling 82. The shaft 80 is journalled in suitable bearings in a housing 84 which housing for a normal propeller design is an extension of the housing which contains the normal parts of the pitch changing mechanism as previously described in connection with Fig. 1. The shaft 80 carries a sun gear 86 meshed with one pinion 88 on a compound planet unit which also includes a pinion 90. A ring gear 92 embraces and engages planet pinions 88 and is normally held against rotation as will be described. A ring gear 94 embraces and engages the planet pinions 90, and drives its hub 96 which is concentric with the shaft 80. The hub 96 is formed with annular sloped ball grooves engaged by balls 98 which act against opposing sloped ball grooves in the pressure plate 100 of a clutch unit 102. The latter includes driving and driven plates, the driving plates being driven through the balls 98 by the gear 94, and the driven plates being splined to a shaft 104 upon which is formed a pinion 106. This is the pinion which meshes with the control gear 18 of the propeller pitch changing mechanism.

As was mentioned previously, the ring gear 92 is normally constrained against rotation. The constraint is afforded through an annular armature 108 splined at 110 to a portion of the housing 84. The armature 108 is coupled to the gear 92 by the releasable engagement of studs 112 in the gear flange, in openings 114 formed in the armature 108. The armature is normally spring pressed by a spring 116 so that the armature and gear are engaged and so that the gear 92 is held against rotation. However, a solenoid 118 is mounted in the housing 84 and may be energized, selectively, to attract the armature in a rightward direction toward it, thus releasing the studs 112 from the holes 114 and allowing the gear 92 to rotate freely without constraint. The purpose of this structure will shortly be described. The various units thus far described in detail are all mounted on appropriate bearings and carriers within the housing 84 to provide a structurally adequate and rugged mechanism.

The operation of the system will now be outlined. As previously indicated, when the propeller is operating normally and producing forward thrust, the shaft 26 takes a leftward position and the engine mounted clutch 64, 66 is uncoupled. If a thrust reversal takes place due to failure or malfunction when forward thrust is normally desired, the clutch 64, 66 is coupled by rightward motion of the propeller shaft 26 and a positive mechanical drive is transmitted to the mechanism 16. The drive is passed through the planetary gearing constituted by the elements 86—94 whereupon the clutch 102 is coupled through the servo action of the balls 98 to drive the pinion 106. This pinion then rotates the pitch control gear 18 in a direction to increase propeller pitch and the pitch increasing movement will persist so long as the clutch 66, 68 is coupled and the propeller shaft 26 is rotating. The torque capacity of the clutch 64, 66 and of the mechanism 16 is sufficient so that it will overpower any of the other normal propeller pitch control mechanisms, namely, the clutches 8 or 10, the brake 12, or the feather motor 15, should any of them be active.

By this mechanism, automatic feathering of the propeller will be afforded, to a feathering blade angle. The propeller may not necessarily be completely feathered but it will be feathered sufficiently to reduce propeller drag to a negligible level as compared with the drag which would obtain if the propeller were windmilling or were non-rotative at a normal blade pitch angle.

The feathering action of the system under ordinary conditions, will be intermittent. A reverse thrust displacement of the propeller shaft will energize the clutch 66, 68 to cause an increment in blade pitch to a point where the reverse thrust becomes small in value, or less than the valve of the preloading spring 62. In that event, the propeller shaft will displace to the left until propeller drag increases to a level to exert sufficient reverse thrust on the propeller shaft 26. Thereupon, another increment in blade pitch will occur. This intermittent action will continue until the blade reaches the maximum feathering angle obtainable before rotation of the propeller shaft ceases.

While the foregoing description has referred to the invention in terms of automatic feathering, it may also be thought of as a control for minimizing undesired negative thrust. In its intermittent action, above described, it will be appreciated that an interval of small negative thrust will produce an increment of propeller blade angle sufficient to overcome the negative thrust, and for the next interval the propeller will produce forward thrust. If the malfunction which allowed the negative thrust persists, such as might occur from an engine failure, the propeller at the higher pitch setting will again be subject to reverse thrust, and another increment of pitch increase will occur. During the intervals when pitch is increased, the propeller will continue to rotate due to the large mass of rotating engine parts, and forward thrust will be produced intermittently with the intervals of reverse thrust, until a high propeller blade angle is attained. Should engine power resume at any time, with cessation of negative thrust, propeller control may be resumed by the normal pitch changing mechanism, or lacking this, the propeller will at least be operating at a forward thrust producing blade angle.

From the foregoing description it will be clear that power for emergency propeller feathering is derived directly and mechanically from the engine shaft and is secured only in response to thrust reversal on the propeller. Pitch changing power for feathering the propeller is applied at the closest possible point to the propeller itself, bypassing all of the normal propeller control mechanism. Thus, the emergency feathering system is independent of normal engine or propeller controls and is also independent of any hydraulic or electrical power sources which themselves are susceptible to malfunction. The system described, therefore, appears to have optimum dependability for its emergency function, due to its nearly complete independence of all other portions of the propeller and engine system.

There is one condition where the emergency feathering system must be rendered inoperative, and that is when reverse pitch operation of the propeller is deliberately selected to enable the development of reverse thrust from the propeller for aircraft braking either in the air or on the ground. Such deliberate reverse pitch operation produces reverse thrust and displaces the propeller shaft 26 rightwardly to engage the clutch 66, 68. Thus, if not circumvented, it would immediately initiate propeller feathering which at that particular time is not wanted. Accordingly, the separable coupling 112, 114 is incorporated in the unit 16. The control and governor assembly 52 is so arranged that when deliberate reverse pitch is selected, the solenoid 118 is energized through conductors 120. The solenoid attracts the armature 108, unlocking the gear 92 for free rotation. Under these conditions, even though the input gear 86 of the unit 16 is being driven from the engine shaft, there will be no driving imposed on the ring gear 94 since the gear 92 may spin free. Accordingly, the clutch 102 will transmit no driving torque to the control gear 18 to cause feathering of the propeller.

Should an electrical system failure occur when the propeller is driving in reverse pitch, the solenoid 118 is deenergized, recoupling the elements 112 and 114 to enforce emergency mechanical feathering upon the propeller.

In the foregoing description, details of the normal pitch changing system have been omitted since they have been fully and adequately disclosed in other patent applications such as Mergen et al. application Serial No. 143,636 filed February 11, 1950, now U.S. Patent No. 2,738,045. Specific details of the servo clutch forming part of the assembly 16 have also been omitted since a similar mechanism has been shown and described in Mergen et al. application Serial No. 78,964 filed March 1, 1949, which is now Patent No. 2,566,705.

While the application shows a particular form of normal mechanical pitch changing mechanism, the invention may be applied to propellers of other types wherein there is some structural element, close to the propeller, which may be positively moved to afford feathering pitch change to the propeller blade, regardless of operation or lack of it in the normal pitch change mechanism. The present invention as disclosed involves certain modifications in the nose structure of the engine driving the propeller but these modifications need not necessarily be incorporated in the engine but may be applied to mechanism forming an integral part of a unitary propeller, applicable to a conventional type of engine. Any modifications may be made, regardless of the particular structure shown in the drawings, which come within the scope of the following claims.

The Belleville washer or spring 62 which normally serves to hold the clutch 64, 66 out of engagement unless the spring is overcome by reverse thrust of adequate amount, is included in the assembly to avoid inadvertent propeller feathering due to transient thrust fluctuations. Such fluctuations, of short duration, and of low magnitude, can occur during engine starting, during propeller pitch change called for by the control system, or during rapid fluctuations in engine power. The spring 62 is of such value as to resist thrust fluctuations of the above type, but the spring will yield upon the presence of reverse thrust of significant amount and duration.

It will further be noted that the clutch 64, 66 along with the gear 68 provides a thrust responsive mechanism which may be utilized for various purposes. The driving torque from the clutch 64, 66 will be a function of the amount of thrust so that the output of the clutch may be utilized as a thrust meter or it may be used to produce a signal for any other desired purpose. The reverse thrust signal as shown, is utilized directly and mechanically to secure propeller feathering but this same signal may be utilized to trigger any other appropriate mechanism for propeller feathering or other purpose. Said signal could be utilized to operate electrical, hydraulic or mechanical mechanisms, for emergency feathering of a propeller if it is not adapted for feathering by a direct drive system such as that disclosed.

By the exercise of mechanical skill, the clutch system 64, 66 might also be adapted for the measurement and signaling of forward, as well as reverse thrust, in any manner desired.

Though a single embodiment of the invention is shown, it is to be understood that the invention may be applied in other forms and in various environments. Changes may be made in the arrangements shown without departing from the spirit of the invention. Reference should be had to the appended claims for definition of the limits of the invention.

What is claimed is:

1. In a power plant comprising an engine and means driven thereby normally to produce positive thrust, a clutch including elements driven by the engine shaft, means to couple said clutch only in response to negative thrust on said engine shaft, and mechanism driven by said clutch when coupled to eliminate substantially all of the negative thrust on said shaft.

2. In a power plant comprising an engine and means driven thereby normally to produce positive thrust, a clutch including elements driven by the engine shaft, means to couple said clutch only in response to negative thrust on said engine shaft, and mechanism driven by said clutch when coupled to produce a signal indicative of said negative thrust.

3. In a power plant comprising an engine and means driven thereby normally to produce positive thrust, a clutch including elements driven by the engine shaft, means to couple said clutch only in response to negative thrust on said engine shaft, and mechanism driven by said clutch when coupled to remove said negative thrust, said clutch including spring biasing means to hold said clutch from coupling for negative thrust values below a predetermined minimum.

4. In a bladed propeller driven by a power plant and normally producing thrust in one direction, said propeller including a blade pitch changing mechanism and a control system connected to actuate said pitch changing mechanism, means mounting said propeller for slight back-and-forth movement along its axis, normal propeller thrust moving said propeller to one extreme of said back-and-forth movement, a clutch driven by the propeller, means to engage said clutch actuated by said propeller when moved toward the opposite extreme of said back-and-forth movement, and mechanism driven by said clutch, when engaged, to overpower said control system and drive said pitch changing mechanism to increase propeller blade pitch.

5. In a bladed propeller driven by a power plant and normally producing thrust in one direction, said propeller including a blade pitch changing mechanism and a control system connected to actuate said pitch changing mechanism, means mounting said propeller for slight back-and-forth movement along its axis, normal propeller thrust moving said propeller to one extreme of said back-and-forth movement, a clutch driven by the propeller, means to engage said clutch actuated by said propeller when moved toward the opposite extreme of said back-and-forth movement, a mechanism driven by said clutch, when engaged, to drive said pitch changing mechanism and to change propeller blade pitch and a selectively operable drive coupling in said clutch driven mechanism to disable the operation of said mechanism.

6. In a bladed propeller driven by a power plant and normally producing thrust in one direction, said propeller including a blade pitch changing mechanism and a control system connected to actuate said pitch changing mechanism, means mounting said propeller for slight back-and-forth movement along its axis, normal propeller thrust moving said propeller to one extreme of said back-and-forth movement, a clutch driven by the propeller, means to engage said clutch actuated by said propeller when moved toward the opposite extreme of said back-and-forth movement, and a mechanism driven by said clutch, when engaged, to drive said pitch changing mechanism and to change propeller blade pitch, said clutch having a torque capacity so as to override said control system and drive said blades toward a feathering blade angle.

7. In a bladed propeller driven by a power plant, said propeller including a normal blade pitch changing mechanism, a control system for the propeller connected to the mechanism and operable to select a plurality of forward and reverse propeller blade angles, a separate pitch increasing driving train extending from the power plant to a part of the pitch changing mechanism and including a clutch engageable to move the propeller blades toward feathering position regardless of forward pitch angle calls made by said control system, and means actuated by said control system to render said separate driving train inoperative when said control system is adjusted for reverse blade angle.

8. In a bladed propeller driven by a power plant, said propeller including a normal blade pitch changing mechanism, a control system for the propeller connected to the pitch changing mechanism and operable to select a plurality of forward propeller blade angles, a separate pitch increasing driving train from the power plant to a part of the pitch changing mechanism of the propeller, said separate train including a clutch engageable to move the propeller blades toward feathering position regardless of other forward pitch calls made by said control system, and means to engage said clutch upon inadvertent thrust reversal of the propeller.

9. In a bladed propeller driven by a power plant, said propeller including a normal blade pitch changing mechanism, a control system for the propeller connected to the pitch changing mechanism and operable to select a plurality of forward propeller blade angles, a separate pitch increasing driving train from the power plant to a part of the pitch changing mechanism of the propeller, said separate train including a clutch engageable to move the propeller blades toward feathering position regardless of other forward pitch calls made by said control system, means to engage said clutch upon inadvertent thrust reversal of the propeller, and a separable selectively operable drive coupling in said train to disable the operation of said train.

10. In a bladed propeller driven by a power plant, said propeller including a normal blade pitch changing mechanism, a control system for the propeller connected to the pitch changing mechanism and operable to select a plurality of forward and reverse propeller blade angles, a separate pitch increasing driving train from the power plant to a part of the pitch changing mechanism of the propeller, said separate train including a clutch engageable to move the propeller blades toward feathering position regardless of other forward pitch calls made by said control system, means to engage said clutch upon inadvertent thrust reversal of the propeller, a separable selectively operable drive coupling in said train, and means responsive to selection of reverse blade pitch in said control system to separate said selectively operable train drive coupling.

11. In a bladed propeller driven by a power plant, said propeller including a normal blade pitch changing mechanism, a control system for the propeller connected to the pitch changing mechanism and operable to select a plurality of forward and reverse propeller blade angles, a separate pitch increasing driving train from the power plant to a part of the pitch changing mechanism of the propeller, said separate train including a clutch engageable to move the propeller blades toward feathering position regardless of other forward pitch calls made by said control system, means to engage said clutch upon inadvertent thrust reversal of the propeller, a separable selectively operable drive coupling in said train, and a solenoid device to selectively separate said train drive coupling.

12. In a bladed propeller driven by a power plant, said propeller including a normally stationary member connected to the propeller blades and movable to change blade pitch, a first mechanism connected to move said member or hold it stationary, a selectively operable control system connected to actuate said first mechanism and member and adjustable to select various pitch ranges including reverse pitch, a second mechanism connected to move said member in one direction only to feather the propeller blades, a driving device driven by said power plant, means sensitive to negative thrust on said propeller connected to couple said driving device to said second mechanism, and means operable to disable said second mechanism actuated by said control system upon selection of reverse propeller blade pitch thereby.

References Cited in the file of this patent

UNITED STATES PATENTS

| 1,998,450 | Davis | Apr. 23, 1935 |
| 2,405,488 | Briner | Aug. 6, 1946 |
| 2,437,189 | Forsyth | Mar. 2, 1948 |
| 2,796,136 | Mock | June 18, 1957 |

FOREIGN PATENTS

| 132,502 | Australia | May 9, 1949 |
| 953,850 | France | May 30, 1949 |